Dec. 1, 1964   F. W. HOTTENROTH ETAL   3,159,119
CHARCOAL STARTER AND COOKER
Filed June 24, 1963
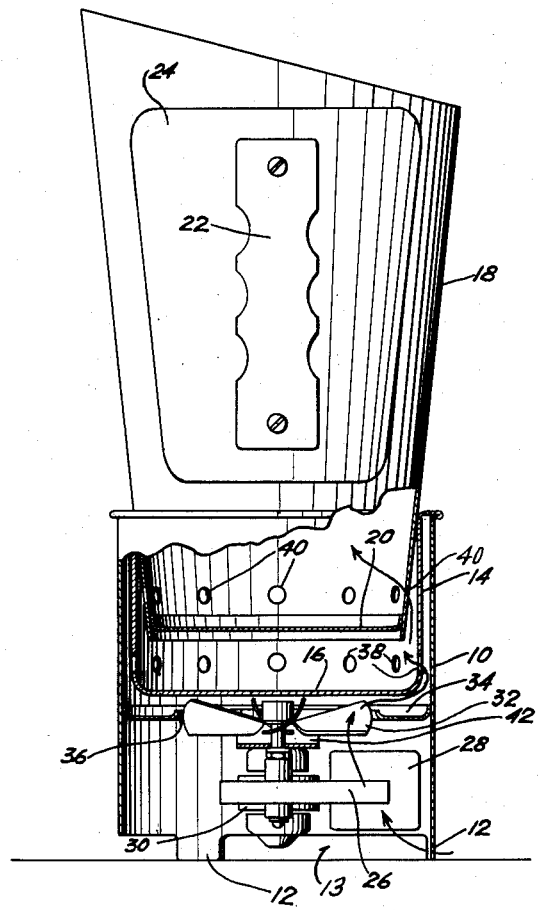
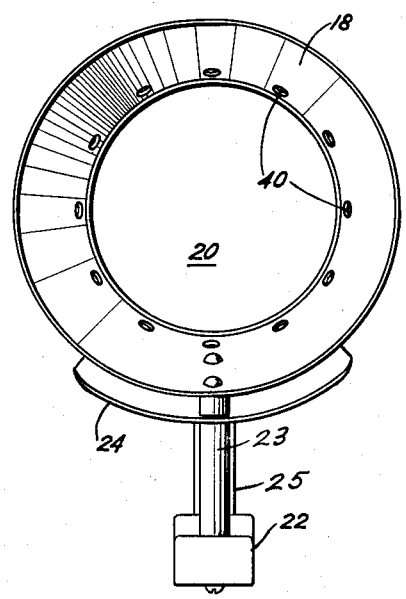
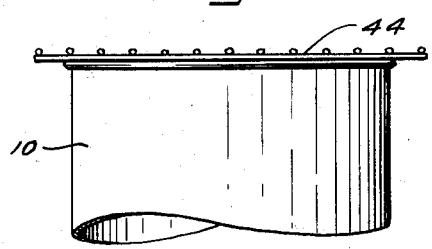
INVENTORS
Fred W. Hottenroth
BY and Harry D. Jacoby
Bair, Freeman & Molinare
ATTORNEYS

3,159,119
CHARCOAL STARTER AND COOKER
Frederick W. Hottenroth, Palos Verdes Peninsula, and Harry D. Jacoby, Palos Verdes Estates, Calif., assignors to Z.Z. Corp., Compton, Calif., a corporation of California
Filed June 24, 1963, Ser. No. 290,041
6 Claims. (Cl. 110—1)

This invention relates to a charcoal starter and cooker of comparatively simple construction which is inexpensive to manufacture.

One object of the invention is to provide an apparatus including air circulating means for providing forced draft to readily start a quantity of charcoal from a small quantity of ignited paper or other tinder as a starter for the charcoal itself.

Another object is to provide a charcoal starter and cooker which includes an open top support provided with air circulating means and a cone-shaped charcoal container removably positioned in the open top thereof which can be associated with the support for starting the charcoal in the container, and after the charcoal is ignited throughout, which takes only about five minutes, the container can be removed from the support and its contents dumped into a barbecue grill or the like.

Still another object is to provide the support and the container so constructed as to efficiently introduce forced air for ignition of the charcoal from the burning paper and for thereafter bringing all the charcoal in the container to a glowing condition suitable for immediate use in a charcoal grill or the like.

A further object is to provide an open top support on which a grid may be positioned so that the apparatus, with its charcoal container removed serves as a cooker after the charcoal has been started and then some of it dumped into the open top support.

Still a further object is to provide a fan driven by a motor or the like to produce circulating air and a separator between the fan and the charcoal container so that glowing coals do not drop onto the ground, the separator having a vertical wall inside the support and spaced from it to provide a space to receive the air, this wall having an arrangement of perforations which cooperate with further perforations in the charcoal container arranged so that there is efficient introduction of air from the fan to the charcoal for igniting and burning the same, and for using the support as a cooker if desired.

With these and other objects in view, our invention consists in the construction, arrangement and combination of the various parts of our charcoal starter and cooker, whereby the objects above contemplated are attained, as hereinafter more fully set forth, pointed out in our claims and illustrated in detail on the accompanying drawing, wherein:

FIG. 1 is an elevation of our charcoal starter and cooker with portions of the support and of the charcoal container broken away and other portions shown in section to illustrate details of construction;

FIG. 2 is a plan view of the charcoal starter, and

FIG. 3 is a partial elevation of the cooker section in use.

On the accompanying drawing we have used the reference numeral 10 to indicate a support in the form of a cylindrical housing. The housing 10 has downwardly projecting feet 12 which provide air entrance spaces 13 as shown in FIG. 1.

Within the housing 10 a horizontal separator 16 is provided which has a vertical wall 14 spaced inwardly from the wall of the housing 10 to provide an air space so that the housing 10 does not become excessively hot.

A charcoal container 18 in the form of a frustrum of a cone with its large end uppermost is provided and is removably positioned in the open top of the housing 10. The charcoal container 18 has an imperforate bottom 20 spaced above the separator 16. A handle 22 is provided for convenience in transporting the charcoal container from the support 10 to the barbecue grill and is supported by upper and lower spacers 23 and 25 in spaced relation to the container as shown in FIG. 2, a polished sheet metal radiation protective shield 24 being also provided to reduce the heat from the container 18 by reflection of radiant heat and thermal circulation of air between the shield and the container. The upper end of the container 18–20 is cut off at an angle as shown in FIG. 1 to facilitate pouring the contents therefrom.

The means for providing forced air circulation consists of a motor having a field core 26, a field coil 28 and an armature 30 which drives a vertical shaft on which is mounted a fan blade 32. A shroud 34 extends across the diameter of the supporting housing 10 and is provided with a fan opening 36 immediately surrounding the periphery of the fan blade 32. The motor 26–28–30 is supported by a cross bracket 42, the ends of which are supported by the housing 10 or the shroud 34.

The vertical wall 14 of the separator 16 is provided with air admission openings 38 therearound adjacent the separator and the charcoal container 18 is provided with air admission openings 40 therearound adjacent the bottom 20. When the container 18 is removed, a grid 44 may be placed on the housing 10 as shown in FIG. 3 for a purpose which will hereinafter appear.

*Practical Operation*

To light charcoal in our device, a piece of paper or other tinder is first placed in the container 18 on the bottom 20 and ignited. The desired amount of charcoal is poured on top of it and the motor 26–28–30 is then energized to create a forced draft which speeds ignition of the charcoal and provides charcoal ready for cooking in about five minutes. The charcoal is then poured into the barbecue grill and cooking proceeds in a normal fashion. If an exceptionally large grill is involved, another charge of charcoal may be prepared using a piece or two of already ignited charcoal in the container in place of the lighted tinder. This further reduces the time required to have glowing charcoal ready for adding to the grill.

In FIG. 1 a series of arrows in the right hand half of the figure shows how air enters through the air entrance spaces 13 and flows past the motor and the fan, through the openings 36 of the shroud 34 and then around the outer edge of the separator 16 and through the openings 38, and finally through the openings 40 to impinge the burning paper or tinder and the charcoal. The shroud 34 and the separator 16 guide the air and in passing from the fan to the openings 38 centrifugal force of the air thrown off the ends of the fan blade 32 contribute to efficient circulation of the draft air.

The amount of forced draft can be regulated by an intermittent on-off timer, a rheostat speed control for the motor, or a draft adjuster of damper type either before or after the fan. Alternatively a frictional brake can be applied to the fan to reduce its speed if there is too much draft. This feature is especially helpful in controlling the amount of heat being produced when the lower section is being used for cooking.

Relatively small current is required for the motor and it may accordingly be powered by dry cell or storage battery, or by 110 volt house lighting current where available.

From the foregoing specification it will be obvious that the housing 10 forms a lower section usable as a forced draft cook stove that also uses charcoal whereas the upper section in conjunction with the lower section operates as a charcoal starter for barbecue grills and the like and for the cook stove section. This type of combination unit is intended for outdoor cookouts where it is desired not only to have a charcoal starter but also to have a cooking unit available for making coffee, frying potatoes, etc. The normal operation of the unit is such that charcoal can be lit in the charcoal starter and most of it spread in the barbecue grill, a small amount being placed in the cooker section and a grid such as shown at 44 in FIG. 3 placed on top of the housing 10 for supporting coffee pots, frying pans and the like. Using forced draft in the cooker provides more heat for cooking than is provided by a normal gas or electric cooking unit inasmuch as the air circulation as disclosed is very efficient in promoting combustion of the charcoal.

Some changes may be made in the construction and arrangement of the parts of our charcoal starter and cooker without departing from the real spirit and purpose of our invention, and it is our intention to cover by our claims any modified forms of structure or use of mechanical equivalents which may reasonably be included within their scope.

We claim as our invention:

1. In a charcoal starter and cooker, an open top support, a cup-shaped charcoal container removably positioned in the open top thereof, air circulating means within said support for forcing air upwardly therethrough, a horizontal separator spaced between said air circulating means and said charcoal container, said separator having means adjacent the periphery of said support for admitting air from said air circulating means to the space between said separator and said charcoal container, and said charcoal container having air admission openings adjacent the bottom thereof communicating with said space.

2. A charcoal starter in accordance with claim 1 wherein said charcoal container is cone-shaped with the larger end of the cone uppermost.

3. A charcoal starter in accordance with claim 1 wherein said separator has a vertical wall inside said support and spaced therefrom, and said means for admitting the air from said air circulating means to the space between said separator and said charcoal container comprises perforations in said vertical wall adjacent said separator.

4. A charcoal starter in accordance with claim 1 wherein said air admission openings are in the side wall of said charcoal container just above the bottom thereof.

5. A charcoal starter in accordance with claim 1 wherein said air circulating means comprises a fan rotatable on a vertical axis, means for rotating said fan, and a horizontal shroud across said support having an opening immediately surrounding said fan.

6. A charcoal starter in accordance with claim 1 wherein a handle is provided on said charcoal container and a radiant protective shield is provided between the handheld portion of said handle and said charcoal container, said shield being spaced from said container.

References Cited in the file of this patent
UNITED STATES PATENTS
3,060,868   MacLachlan _____ Oct. 30, 1962